US009024885B2

(12) United States Patent
Ahn et al.

(10) Patent No.: US 9,024,885 B2
(45) Date of Patent: May 5, 2015

(54) TOUCH SCREEN DISPLAY APPARATUS FOR PERFORMING FLASH MODE AND METHOD OF OPERATING THE APPARATUS

(75) Inventors: Soon-Sung Ahn, Yongin (KR); Sung-Un Park, Yongin (KR); Ja-Seung Ku, Yongin (KR); Brent Jang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 516 days.

(21) Appl. No.: 12/577,573

(22) Filed: Oct. 12, 2009

(65) Prior Publication Data

US 2010/0097391 A1 Apr. 22, 2010

(30) Foreign Application Priority Data

Oct. 17, 2008 (KR) ........................ 10-2008-0102106

(51) Int. Cl.
G06F 3/041 (2006.01)
G06F 3/045 (2006.01)
G06F 3/042 (2006.01)

(52) U.S. Cl.
CPC ............ *G06F 3/0416* (2013.01); *G06F 3/0412* (2013.01); *G06F 3/042* (2013.01)

(58) Field of Classification Search
CPC ....... G06F 3/0414; G06F 3/041; G06F 3/042; G06F 3/0425; G06F 3/044; G06F 2203/04105; G06F 2203/04106
USPC .................. 345/156–158, 173, 175
See application file for complete search history.

(56) References Cited

U.S. PATENT DOCUMENTS

| 6,664,489 B2 | 12/2003 | Kleinhans et al. |
| 2002/0079512 A1 | 6/2002 | Yamazaki et al. |
| 2006/0033016 A1 | 2/2006 | Ogawa et al. |
| 2006/0077186 A1* | 4/2006 | Park et al. ...................... 345/173 |
| 2006/0109258 A1 | 5/2006 | Takisawa |
| 2006/0170658 A1 | 8/2006 | Nakamura et al. |
| 2007/0216637 A1* | 9/2007 | Ito ................................ 345/102 |
| 2007/0296688 A1 | 12/2007 | Nakamura et al. |
| 2008/0122803 A1* | 5/2008 | Izadi et al. .................... 345/175 |
| 2008/0204427 A1 | 8/2008 | Heesemans et al. |

(Continued)

FOREIGN PATENT DOCUMENTS

| CN | 1779631 A | 5/2006 |
| JP | 57-99243 | 6/1982 |
| JP | 59-161727 | 9/1984 |

(Continued)

OTHER PUBLICATIONS

EPO Extended Search Report dated Oct. 14, 2011, for corresponding European Patent Application No. 09252433.9, 8 pages.

(Continued)

*Primary Examiner* — Kenneth Bukowski
(74) *Attorney, Agent, or Firm* — Christie, Parker & Hale, LLP

(57) ABSTRACT

A touch screen display apparatus includes a panel including a light emitting device for displaying a display image and an optical sensor for generating a touch image object; a touch sensing unit on the panel for sensing a touch of a touch object; and a light emission controller for controlling the light emitting device to emit light when a touch of the touch object is sensed by the touch sensing unit.

26 Claims, 13 Drawing Sheets

(56) References Cited

U.S. PATENT DOCUMENTS

| | | | |
|---|---|---|---|
| 2009/0189866 A1* | 7/2009 | Haffenden et al. | 345/173 |
| 2009/0244026 A1* | 10/2009 | Purdy et al. | 345/174 |

FOREIGN PATENT DOCUMENTS

| | | |
|---|---|---|
| JP | 62-257517 | 11/1987 |
| JP | 09-237158 | 9/1997 |
| JP | 2001-5613 | 1/2001 |
| JP | 2002-287900 | 10/2002 |
| JP | 2006-079499 | 3/2006 |
| JP | 2007-183706 | 7/2007 |
| JP | 2007-248815 | 9/2007 |
| JP | 2008-83322 | 4/2008 |
| KR | 1020060035833 A | 4/2006 |
| KR | 10-2006-0089166 | 8/2006 |
| KR | 10-2007-0021366 | 2/2007 |
| KR | 10-2007-0039113 | 4/2007 |
| KR | 10-2008-0045543 | 5/2008 |
| TW | 200606694 | 2/2006 |

OTHER PUBLICATIONS

JPO Office action dated Nov. 22, 2011, for corresponding Japanese Patent Application No. 2009-240346, listing the cited references, 2 pages.

Korean Registration Determination Certificate, dated Jan. 21, 2011, for Priority Korean Application No. 10-2008-0102106, 5 pages.

KIPO Office action dated Feb. 18, 2010, for priority Korean application 10-2008-0102106, noting listed references in this IDS.

Taiwanese Office action dated May 16, 2013, for corresponding Taiwan Patent application 098134723, (11 pages).

SIPO Office action dated Jun. 3, 2013, issued in corresponding CN Application No. 200910205673.X (5 pages).

* cited by examiner

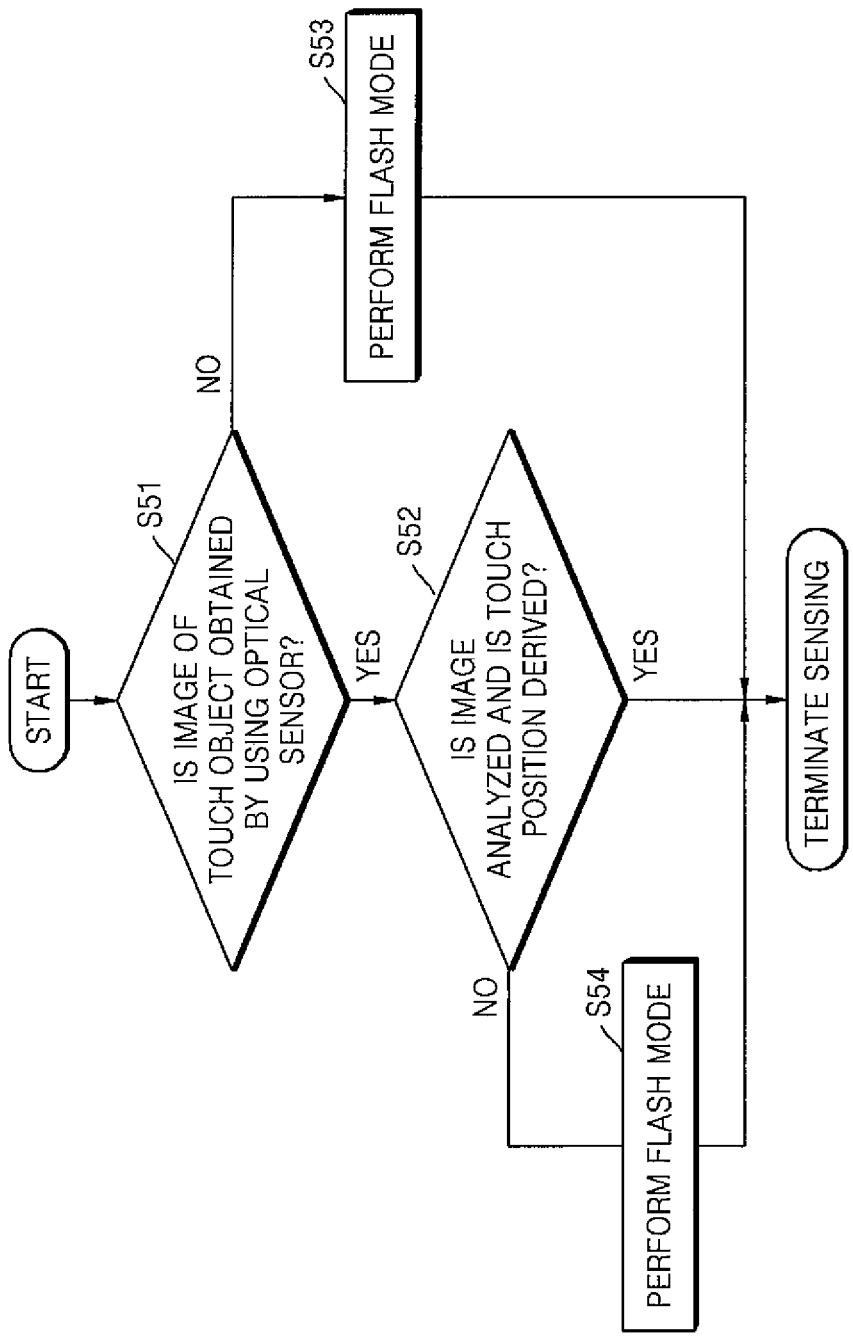

TOUCH SCREEN DISPLAY APPARATUS FOR PERFORMING FLASH MODE AND METHOD OF OPERATING THE APPARATUS

CROSS-REFERENCE TO RELATED APPLICATION

This application claims priority to and the benefit of Korean Patent Application No. 10-2008-0102106, filed on Oct. 17, 2008, in the Korean Intellectual Property Office, the disclosure of which is incorporated herein in its entirety by reference.

BACKGROUND OF THE INVENTION

1. Field of the Invention

The present invention relates to a touch screen display apparatus which easily recognizes a touch position by using an optical sensor and a method of operating the apparatus.

2. Description of the Related Art

A touch screen display apparatus in which an optical sensor is integrated with a panel, inputs information by detecting a finger image that is projected on a screen or by detecting light that is irradiated from a light emitting object such as a light pen.

Specifically, a touch screen display apparatus may derive a touch position by using external light or by using internal light emitted by the touch screen display apparatus itself. However, when the intensities of the external light and the internal light are low, such as when a black user interface (UI) is displayed while the intensity of the external light is low, a sensing operation may not be performed by an optical sensor. In addition, when the intensities of the external light and the internal light are similar to each other, an image of a touch object is not formed, and thus, the optical sensor may not perform a sensing operation. Thus, when conditions of external light and/or internal light are inappropriate, as described above, a touch position may not be recognized, thus limiting the effectiveness of the touch screen display apparatus.

SUMMARY OF THE INVENTION

Aspects of embodiments of the present invention are directed toward a touch screen display apparatus which effectively recognizes a touch position by utilizing an optical sensor, and a method of operating the apparatus.

According to an exemplary embodiment of the present invention, there is provided a touch screen display apparatus including: a panel including a light emitting device for displaying a display image and an optical sensor for generating a touch object image; a touch sensing unit on the panel for sensing a touch of a touch object; and a light emission controller for controlling the light emitting device to emit light when a touch of the touch object is sensed by the touch sensing unit.

The light emission controller may include: a touch measuring portion for measuring a touch sensing signal corresponding to the touch of the touch object; a touch determining portion for determining whether a touch is performed by comparing the touch sensing signal with a reference signal; and a light emission signal generator for generating a light emission signal when a touch of the touch object is performed in accordance with a result of the determination of the touch determining portion.

The apparatus may further include a position deriving portion for deriving a touch position from the touch object image.

The apparatus may further include a flash mode controller for controlling operations of the touch sensing unit and the light emission controller.

The apparatus may further include an illuminance sensing unit for sensing an external illuminance; and an illuminance determining portion for comparing the external illuminance with a reference illuminance.

When the external illuminance is less than the reference illuminance and the touch position is not derived by the position deriving portion, the flash mode controller may be configured to operate the touch sensing unit and the light emission controller.

The apparatus may further include: a brightness deriving portion for deriving a brightness of the display image; and a brightness determining portion for comparing the brightness of the display image with a reference brightness.

When the brightness of the display image is less than the reference brightness and the touch position is not derived by the position deriving portion, the flash mode controller may be configured to operate the touch sensing unit and the light emission controller.

The apparatus may further include: an illuminance deriving portion for deriving an external illuminance from the optical sensor; and an illuminance determining portion for comparing the external illuminance with a reference illuminance.

When the external illuminance is less than the reference illuminance and the touch position is not derived by the position deriving portion, the flash mode controller may be configured to operate the touch sensing unit and the light emission controller.

The apparatus may further include: a brightness deriving portion for deriving a brightness of the display image; and a brightness determining portion for comparing the brightness with a reference brightness, wherein when the brightness is less than the reference brightness, the flash mode controller may be configured to operate the touch sensing unit and the light emission controller.

The apparatus may further include a position deriving portion for deriving a touch position from the touch object image, wherein when the touch position is not derived by the position deriving portion, the flash mode controller may be configured to operate the touch sensing unit and the light emission controller.

The position deriving portion may include an image obtaining portion for obtaining the touch object image and a position calculating portion for determining a touch position by analyzing the touch object image, and wherein the touch position may be not derived by the position deriving portion when the touch object image is not obtained by the image obtaining portion or when the touch position is not determined by the position calculating portion.

According to another exemplary embodiment of the present invention, there is provided a method of driving a touch screen display apparatus including a light emitting device for displaying a display image and an optical sensor for generating a touch object image, the method including: sensing a touch of a touch object and generating a sensing signal; generating a light emission signal corresponding to the sensing signal; and emitting light in accordance with the light emission signal, wherein the emitting of the light is performed by the light emitting device.

The method may further include comparing the sensing signal with a reference signal, wherein when the sensing signal is greater than the reference signal, the light emission signal may be generated.

The method may further include: obtaining the touch object image from emission of the light emitting device; and deriving the touch position from the touch object image.

The method may further include: sensing an external illuminance; comparing the external illuminance with a reference illuminance, and generating the sensing signal and the light emission signal when the external illuminance is less than the reference illuminance.

The method may further include: deriving brightness of the display image; comparing the brightness with a reference brightness, and generating the sensing signal and the light emission signal when the brightness is less than the reference brightness.

The external illuminance may be measured by the optical sensor.

When the touch position is not derived by the position deriving portion, the sensing signal and the light emission signal may be generated.

BRIEF DESCRIPTION OF THE DRAWINGS

The accompanying drawings, together with the specification, illustrate exemplary embodiments of the present invention, and, together with the description, serve to explain the principles of the present invention.

FIG. 14 is a flowchart illustrating a method of driving a touch screen display apparatus for performing a flash mode when a touch position is not searched for, according to another embodiment of the present invention.

DETAILED DESCRIPTION

The present invention will now be described in more detail with reference to the accompanying drawings, in which exemplary embodiments of the invention are shown.

Figure 1:
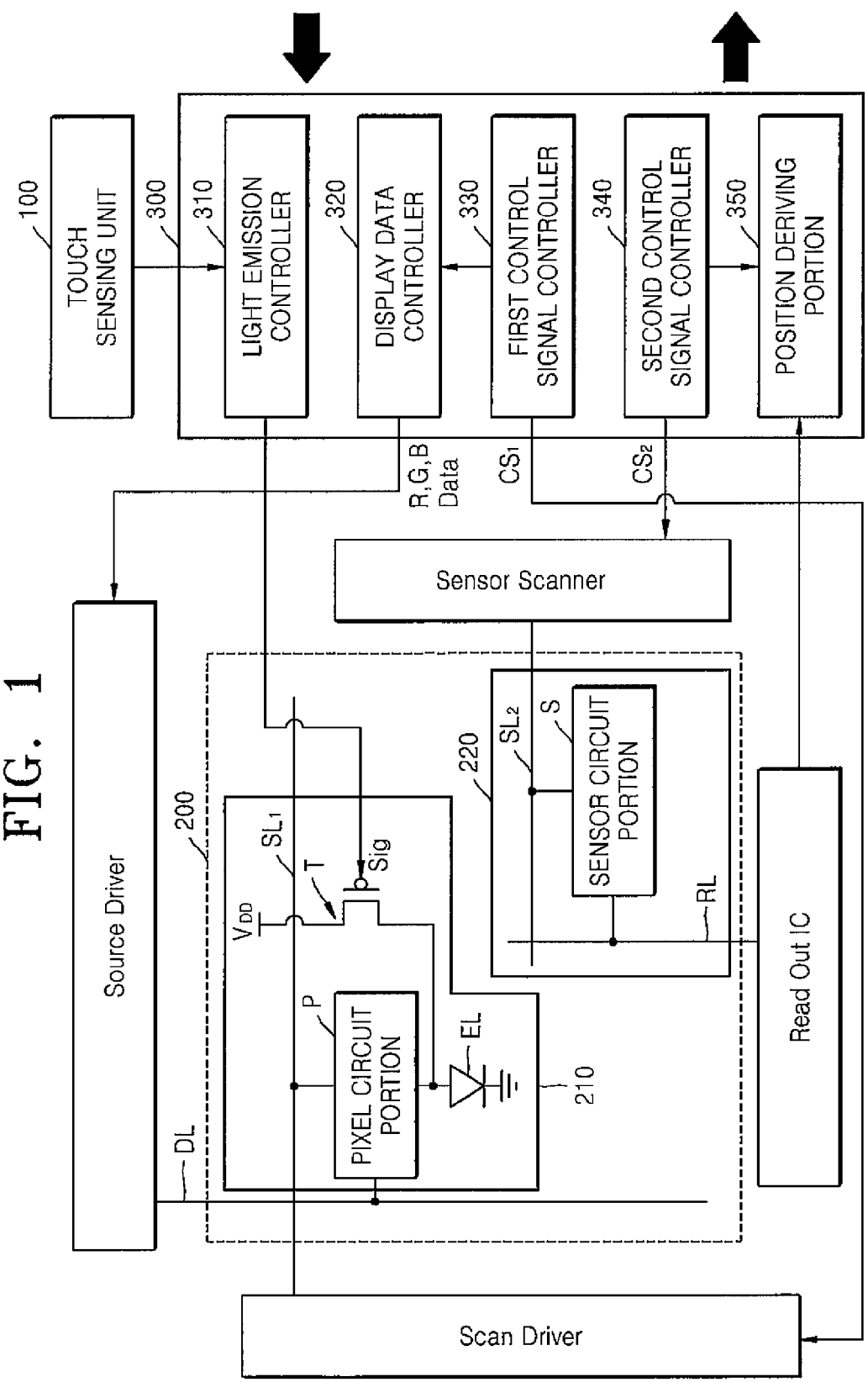
FIG. 1 schematically illustrates a touch screen display apparatus according to an embodiment of the present invention.

FIG. 1 schematically illustrates a touch screen display apparatus according to an embodiment of the present invention.

Referring to FIG. 1, the touch screen display apparatus according to the current embodiment of the present invention includes a touch sensing unit 100, an organic light emitting display panel 200, a plurality of drivers which drive the organic light emitting display panel 200, and a controller 300. Specifically, the touch sensing unit 100 is a touch panel which senses a touch by utilizing either an electrostatic capacity method, a pressure reducing method, or a resistive membrane method. The touch sensing unit 100 is disposed in front of the organic light emitting display panel 200 and may sense whether an object touches the touch panel. Since the touch sensing unit 100 is disposed in front of the organic light emitting display panel 200, the touch sensing unit 100 may be formed of a transparent material having very good (or high) light transmittance.

The organic light emitting display panel 200 includes a display unit 210 and an optical sensor unit 220, which may be formed together. The display unit 210 includes a first scan line $SL_1$ and a data line DL, which are disposed to cross each other, a pixel circuit portion P, which is connected to the first scan line $SL_1$ and the data line DL, and an organic electroluminescent (EL) device, which emits light corresponding to a current or voltage supplied by the pixel circuit portion P. In the following embodiments, the EL device is, for example, a light emitting device.

In the present embodiment, the organic light emitting display panel 200 includes the first scan line $SL_1$, the data line DL, the pixel circuit portion P that is connected between the first scan line $SL_1$ and the data line DL, and the organic EL device. However, although not shown, the organic light emitting display panel 200 may include a plurality of first scan lines $SL_1$ that are arranged in parallel, a plurality of data lines DL that are arranged in parallel, a plurality of pixel circuit portions P that are connected between the plurality of first scan lines $SL_1$ and the plurality of data lines DL, and a plurality of organic ELs that are respectively connected to the plurality of pixel circuit portions P.

The plurality of first scan lines $SL_1$ allow the plurality of pixel circuit portions P to operate in response to a first control signal $CS_1$ supplied by the first control signal controller 330 to the scan driver. Display data is applied to the plurality of data lines DL from a source driver in synchronization with the first control signal $CS_1$. A current or voltage corresponding to the display data is generated by each of the pixel circuit portions P and is output to the plurality of organic ELs to emit light so that the organic light emitting display panel 200 can display an image (e.g., a predetermined image).

The display unit 210 includes a switching element T which controls the emission of the plurality of organic ELs so as to perform a flash mode. When performing the flash mode, the switching element T may supply a set (or predetermined) current or voltage corresponding to a driving voltage VDD to the plurality of organic ELs for the plurality of organic ELs to emit light. The flash mode will be described later in greater detail.

The optical sensor unit 220 includes a plurality of second scan lines $SL_2$ and a plurality of output lines RL, and a sensor circuit portion S, which is connected between the plurality of second scan lines $SL_2$ and the plurality of output lines RL. The sensor circuit portion S may include an optical sensor and an amplification circuit that amplifies signals sensed by the optical sensor. The optical sensor may be a PIN type optical diode.

The optical sensor unit 220 calculates a coordinate of a touch position by interpreting a finger image due to external light or internal light when the optical sensor unit 220 senses that an object such as a user's finger has touched a touch panel of the touch sensing unit 100, or when the optical sensor unit 220 forms an image by interpreting an amount of light, and correspondingly calculates a position coordinate of the touch position.

The plurality of second scan lines $SL_2$ transmit a second control signal $CS_2$, which operates the sensor circuit portion S and is supplied by a sensor scanner. The plurality of output lines RL output signals that are sensed by the sensor circuit portion S to a read out integrated circuit (ROIC). Then, the signals are transmitted from the ROIC to the controller 300 in which the touch position is calculated.

The touch screen display apparatus according to the current embodiment of the present invention further includes the controller 300. Specifically, the controller 300 may include a light emission controller 310, a display data controller 320, a first control signal controller 330, a second control signal controller 340, and a position deriving portion 350.

The light emission controller 310 outputs a light emission signal Sig that operates the switching element T of the organic light emitting display panel 200, due to a touch sensing signal transmitted by the touch sensing unit 100, and the plurality of organic ELs emit light due to the light emission signal Sig. When the conditions of external light and internal light are inappropriate, a touch is sensed by the touch sensing unit 100, and the switching element T operates in synchronization with the sensed touch. Thus, a current or voltage corresponding to a driving voltage VDD is supplied by a VDD source that is connected to a terminal of the switching element T so that the plurality of organic ELs emit light. Thus, the internal light is forcibly generated so that the optical sensor unit 220 can perform a sensing operation.

Figure 2:
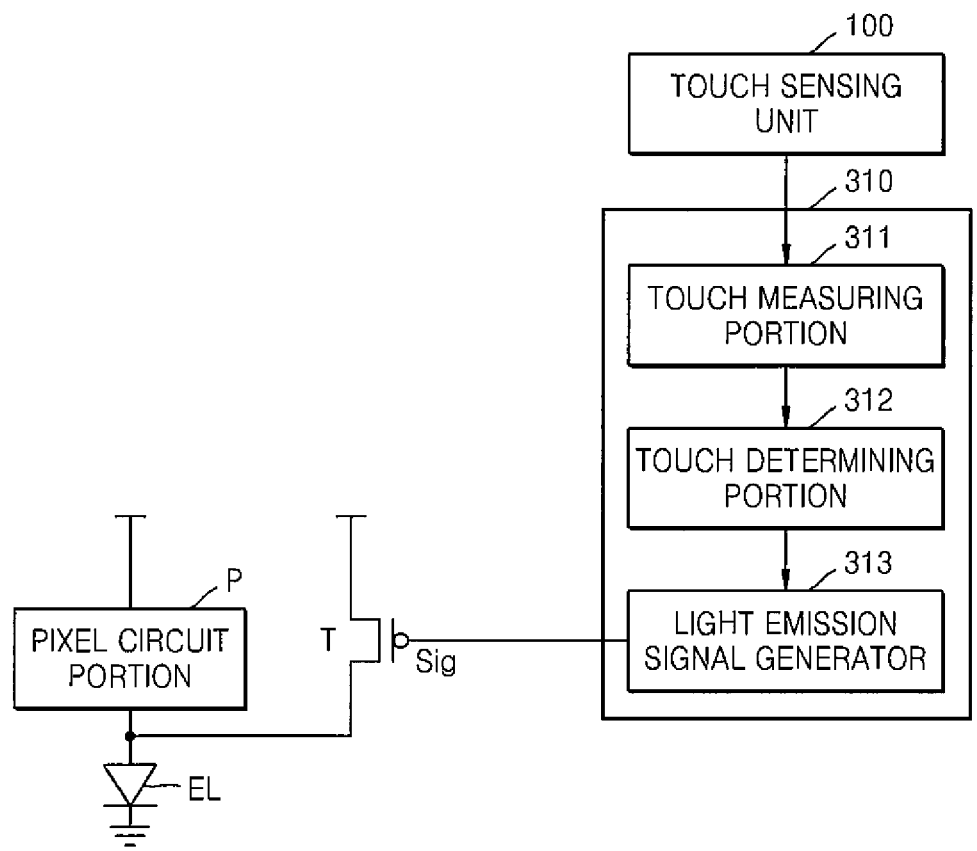
FIG. 2 schematically illustrates components for performing a flash mode in the touch screen display apparatus of FIG. 1.

An example of the light emission controller 310 will now be described with reference to FIG. 2 in greater detail. The light emission controller 310 may include a touch measuring portion 311, a touch determining portion 312, and a light emission signal generator 313.

The touch measuring portion 311 measures the touch sensing signal that is supplied by the touch sensing unit 100. For example, the touch sensing unit 100, utilizing an electrostatic capacity method, may sense a change of electrostatic capacity due to a touch of a conductive object, and the touch measuring portion 311 may measure the amount of change of electrostatic capacity. The touch determining portion 312 may determine whether the amount of change of electrostatic capacity is equal to or greater than a reference amount (e.g., a predetermined reference amount). In other words, the touch determining portion 312 determines whether a touch of the object is performed by utilizing the touch sensing unit 100. As a result of the determination, when it is determined that the amount of change of electrostatic capacity is equal to or greater than the reference amount, the light emission signal generator 313 generates the light emission signal Sig to operate the switching element T of the organic light emitting display panel 200 so that the plurality of organic ELs emit light.

Figure 3:
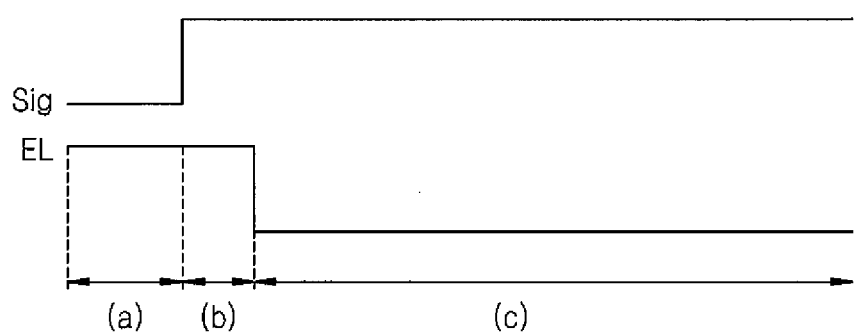
FIG. 3 is a timing diagram of an organic electroluminescent (EL) device and a switching element of the touch screen display apparatus of FIG. 2.

The light emission signal Sig that is applied to the switching element T and an operating signal of the plurality of organic ELs may be illustrated by a timing diagram of FIG. 3.

Referring to FIG. 3, a touch is sensed by the touch sensing unit 100 during a period (a), and the light emission controller 310 generates the light emission signal Sig at a low level. Thus, the plurality of organic ELs emit light for the period (a). The light emission controller 310 generates the light emission signal Sig at a high level during a period (b) so that the emission of light by the plurality of organic ELs is stopped. In this case, a touch position may be determined and input information corresponding to the touch position may be determined. After that, the plurality of organic ELs emit light due to a light emission signal em at a low level that is generated during a period (c) based on display data. The display data is based on the input information.

In this case, the emission of light by the plurality of organic ELs is not to display an image but is for the optical sensor unit 220 to effectively perform a sensing operation. For example, when the conditions of external light and internal light are inappropriate, the light emission signal Sig is generated so that the plurality of organic ELs emit light for an amount of time (e.g., a predetermined amount of time). The plurality of organic ELs may emit light during a period in which the optical sensor unit 220 generates the amount of light required for the optical sensor unit 220.

Referring back to FIG. 1, the display data controller 320 and the first control signal controller 330 output signals that are used to control the touch screen display apparatus so that a plurality of pixels emit light and an image is displayed. The display data controller 320 transmits display data, i.e., red (R), green (G), and blue (B) data to the source driver. Then, the source driver transmits signals corresponding to the display data (R, G, B data) to the plurality of data lines DL. The first control signal controller 330 transmits the first control signal $CS_1$ to the scan driver. Then, the scan driver sequentially transmits scan signals to the plurality of first scan lines $SL_1$ in response to the first control signal $CS_1$.

The second control signal controller 340 and the position deriving portion 350 are controllers related to the optical sensor unit 220. The second control signal controller 340 transmits the second control signal $CS_2$ to the sensor scanner. Then, the sensor scanner sequentially applies scan signals to the plurality of second scan lines $SL_2$ in response to the second control signal $CS_2$. The position deriving portion 350 calculates a touch position by utilizing a signal that is sensed by the optical sensor unit 220 and is input to the position deriving portion 350 via the ROIC.

A method of driving the touch screen display apparatus having the above structure, according to an embodiment of the present invention, will now be described with reference to FIG. 4.

Figure 4:
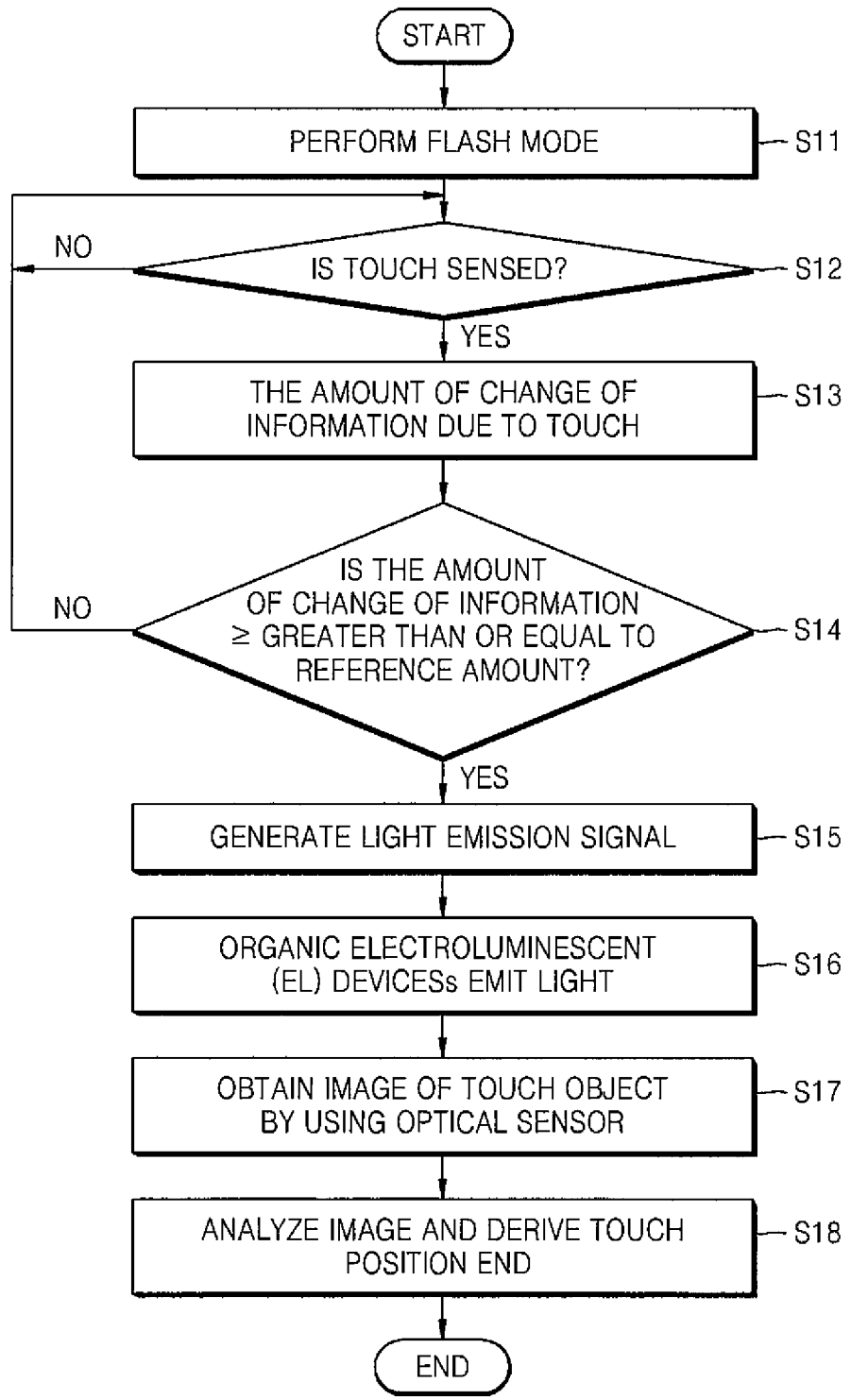
FIG. 4 is a flowchart illustrating a method of driving the touch screen display apparatus of FIG. 1, according to an embodiment of the present invention.

Referring to FIG. 4, in operation S11, a flash mode is performed.

In operation S12, the touch sensing unit 100 determines whether a touch of an object is sensed. When it is determined in operation S12 that a touch is not sensed, the touch sensing unit 100 again determines whether a touch of an object is sensed. That is, operation S12 is re-performed.

When it is determined in operation S12 that the touch of the object is sensed, in operation S13, an amount of change of touch information due to the touch is measured. For example, in the case of utilizing the electrostatic capacity method, the amount of change of capacitance, the amount of change of permittivity, the amount of change of a gap, etc., may be measured, and in the case of utilizing the resistive layer method, the amount of change of resistance, etc., may be measured.

In operation S14, it is determined whether the amount of change of information is equal to or greater than a reference amount, where the reference amount may be determined in advance from, for example, prior test results. When it is determined in operation S14 that the amount of change of information is less than the reference amount, it is determined that the touch is not carried out by an input unit, and thus, the touch sensing unit 100 returns to operation S12 to determine whether a touch of an object is sensed.

Otherwise, when it is determined in operation S14 that the amount of change of information is equal to or greater than the reference amount, a light emission signal is generated in operation S15 to operate the switching element T that controls emission of the plurality of organic ELs.

In operation S16, the plurality of organic ELs emit light. The plurality of organic ELs typically emit light so that a display image may be displayed based on display data. However in operation S16, the plurality of organic ELs instead emit light based on the touch information that is obtained by the touch sensing unit 100. In operation S16, as a pre-processing operation for performing a sensing operation of the optical sensor unit 220, the plurality of organic ELs emit light based on the touch information.

In operation S17, an image of the touch object is obtained by utilizing optical sensors by utilizing emission of the plurality of organic ELs. Then, in operation S18, the image of the touch object is analyzed and the touch position is derived.

Figure 5:
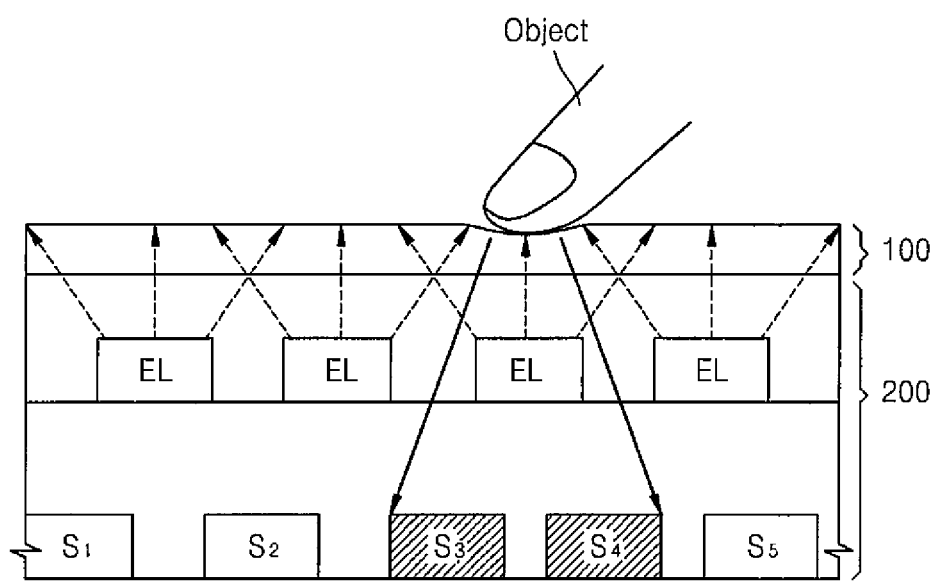
FIG. 5 is a schematic cross-sectional view explaining driving of the touch screen display apparatus of FIG. 1.

The operation S17 of performing a sensing operation by utilizing optical sensors S by emitting the plurality of organic ELs will now be described in more detail with reference to FIG. 5. Referring to FIG. 5, the touch sensing unit 100 is disposed on the organic light emitting display panel 200, and the plurality of organic ELs are disposed on an upper portion of the organic light emitting display panel 200, and first through fifth optical sensors $S_1$ to $S_5$ are integrated between the plurality of organic ELs. When a touch by a touch object is sensed, the plurality of organic ELs emit light. Thus, when an intensity of external light is low and/or when the amount of light utilized to display an image (i.e., when an intensity of internal light) is low, the plurality of organic ELs forcibly emit light. The internal light that is emitted by the plurality of organic ELs is reflected by the object, and the reflected light is received by the third optical sensor $S_3$ and the fourth optical sensor $S_4$ so that the touch object can be imaged. The image of the touch object may be black and white.

The image of the touch object may be analyzed and the touch position may be recognized.

Hereinafter, touch screen display apparatuses and methods of driving the same according to embodiments of the present invention will be described in more detail.

FIGS. 6 through 9 illustrate a touch screen display apparatus for performing a flash mode when intensities of external light and internal light are low, according to another embodiment of the present invention. Hereinafter, like reference numerals and like names are the same as those of FIG. 1, etc. and thus, a detailed description thereof will not be provided again.

A touch screen display apparatus and a method of driving the same when the intensities of external light and internal light are low, according to embodiments of the present invention, will now be described with reference to FIGS. 6 and 7.

Figure 6:
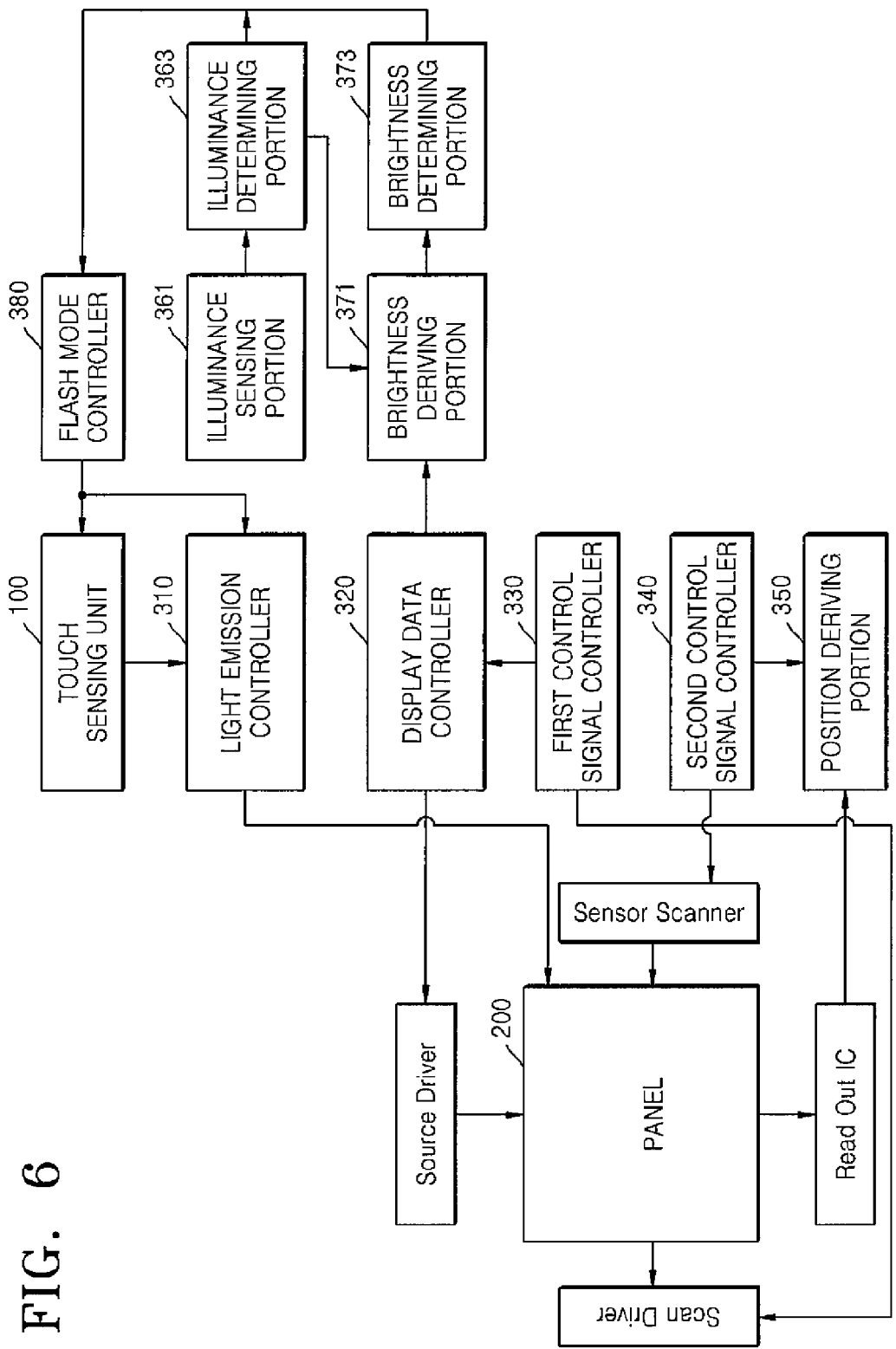
FIG. 6 schematically illustrates a touch screen display apparatus for performing a flash mode when the intensities of external light and internal light are low, according to another embodiment of the present invention.

In addition to components described in previous embodiments, the touch screen display apparatus of FIG. 6 further includes an illuminance sensing portion 361. The flash mode is controlled based on illuminance sensed by the illuminance sensing portion 361.

Specifically, the touch screen display apparatus includes the touch sensing unit 100, the organic light emitting display panel 200 including a display unit for displaying an image and an optical sensor unit for generating an image of a touch object, the source driver that drives the display unit of the organic light emitting display panel 200, the scan driver, the sensor scanner that drives the optical sensor unit of the organic light emitting display panel 200, and the read out integrated circuit (ROIC).

Figure 7:
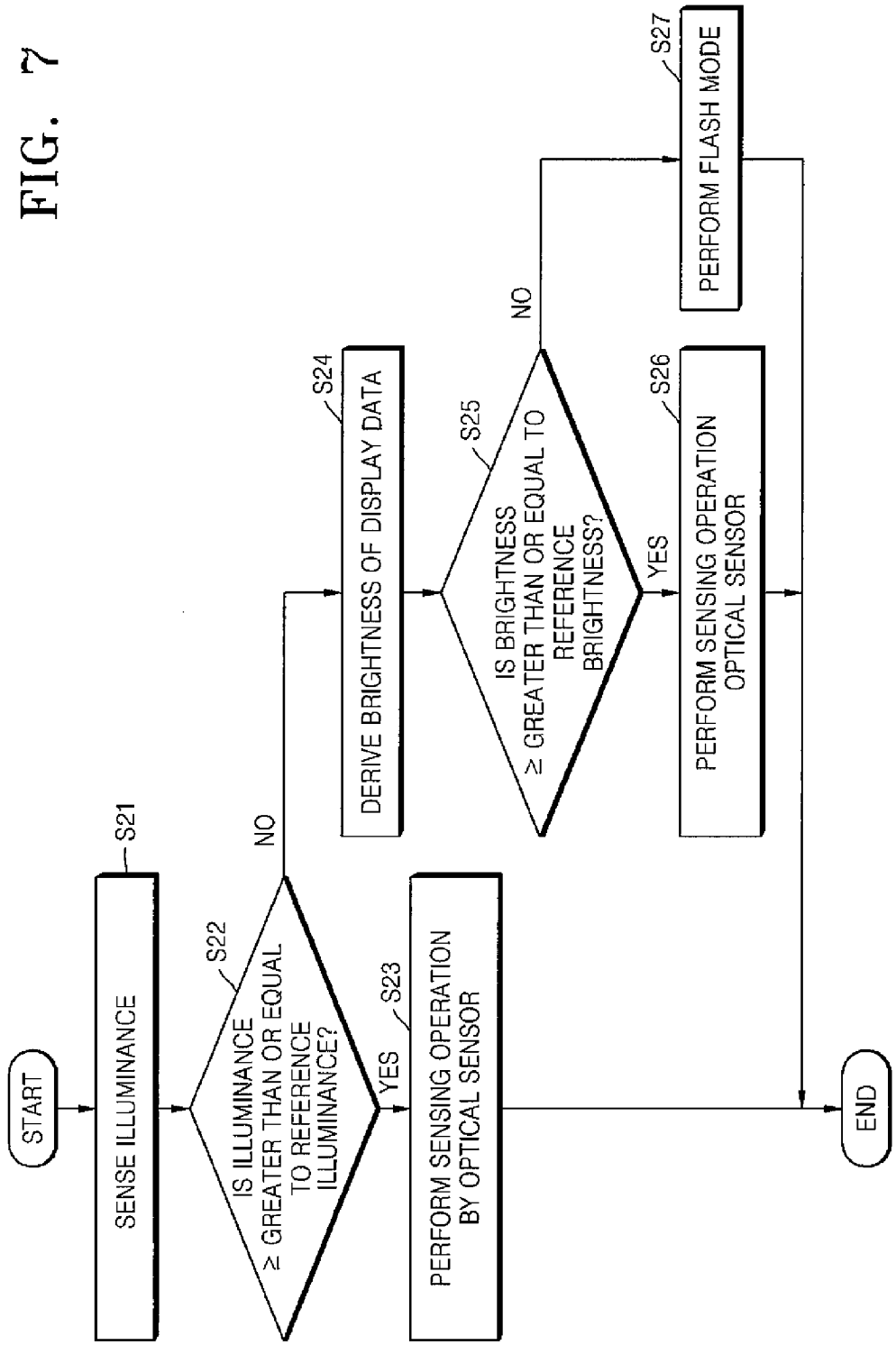
FIG. 7 is a flowchart illustrating a method of driving the touch screen display apparatus of FIG. 6, according to another embodiment of the present invention.

Referring to FIGS. 6 and 7, in operation S21, the illuminance sensing portion 361 senses the amount of external light, i.e., illuminance. In operation S22, it is determined whether the illuminance sensed by an illuminance determining portion 363 is equal to or greater than a reference illuminance. When it is determined in operation S22 that the illuminance is equal to or greater than the reference illuminance, external light conditions are appropriate for performing a sensing operation, and thus, the flash mode does not need to be performed. In other words, in operation S23, the optical sensor may perform the sensing operation by using external light. Thus, the image of the touch object is obtained so that the touch position may be determined.

When it is determined in operation S22 that the illuminance is less than the reference illuminance, in operation S24, a brightness of display data is derived. The display data may be derived from the display data controller 320 by using a brightness deriving portion 371. The display data is utilized to implement a current image included in a user interface (UI) and may be utilized to determine the amount of light emitted by the organic light emitting display panel 200, i.e., the amount of internal light from the brightness of the displayed image.

In operation S25, a brightness determining portion 373 determines whether the brightness (e.g., of internal light) is equal to or greater than a reference brightness. When the brightness determining portion 373 determines in operation S25 that the brightness is equal to or greater than the reference brightness, in operation S26, the sensing operation may be performed by the optical sensor by utilizing internal light emitted by the plurality of organic ELs from to the display data.

However, when the illuminance determining portion 363 determines both that the illuminance is less than the reference illuminance and the brightness determining portion 373 determines that the brightness is less than the reference brightness, i.e., when the intensities of the external light and the internal light are low, the amount of light for the optical sensor to effectively perform the sensing operation may not be sufficient. In this case, the process proceeds to operation S27, where flash mode is performed. That is, the information is transmitted to a flash mode controller 380, and the touch sensing unit 100 and the light emission controller 310 operate based on the information. Thus, the touch sensing unit 100 senses whether the touch of the object is sensed, information about the case when the touch of the object is sensed is transmitted to the light emission controller 310, and the light emission controller 310 controls the organic light emitting display panel 200 so that the organic light emitting display panel 200 emits light for a time based on when the touch of the object is sensed. Specifically, the plurality of organic ELs emit light. Due to the emission of light by the plurality of organic ELs, an image of the touch object is obtained by the optical sensor, such that the image may be analyzed and the touch position may be determined.

Figure 8:
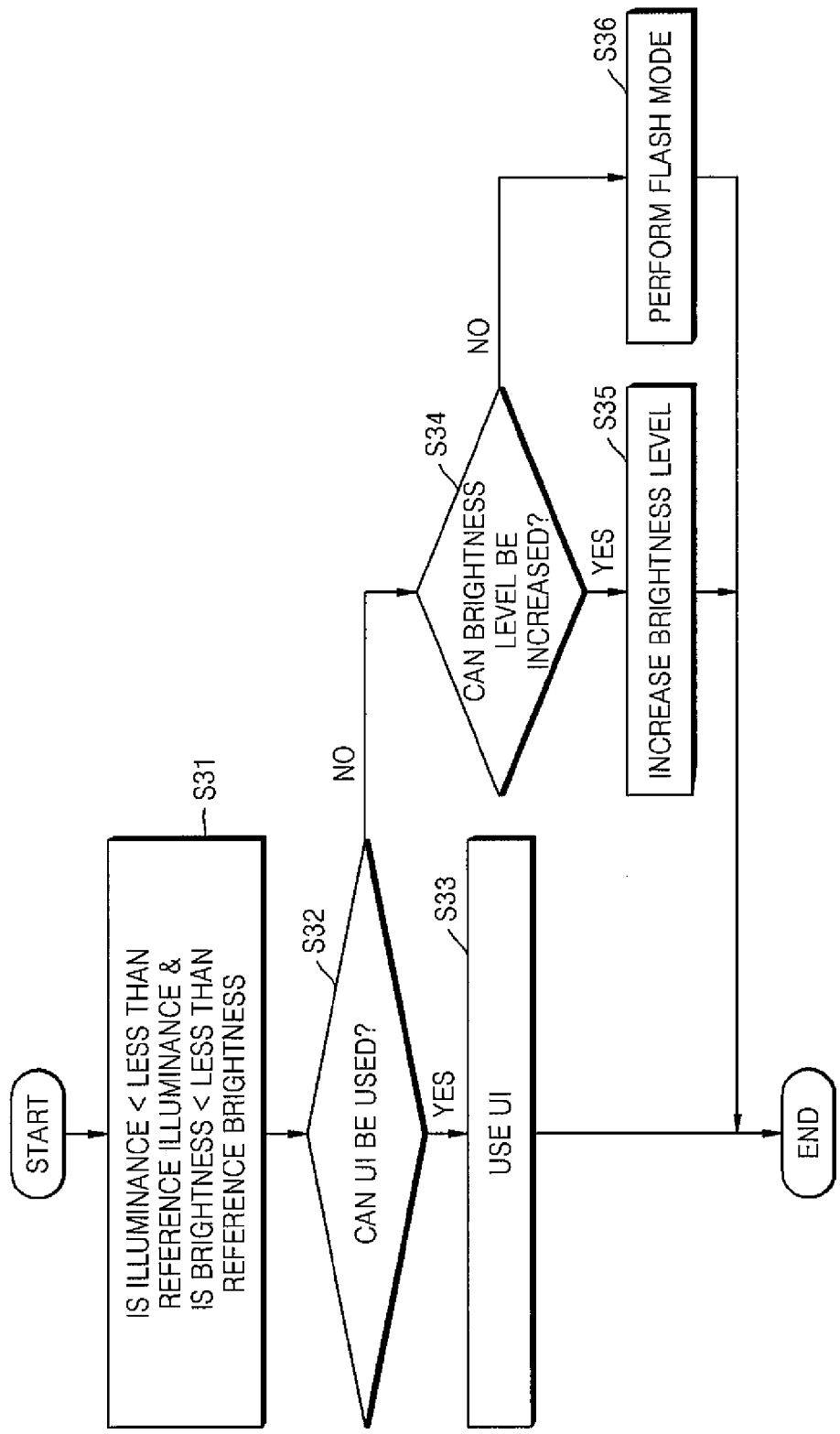
FIG. 8 is a flowchart illustrating a method of driving the touch screen display apparatus of FIG. 6, according to another embodiment of the present invention.

A method of driving the touch screen display apparatus of FIG. 6, according to another embodiment of the present invention, will now be described with reference to FIG. 8.

In this method of driving the touch screen display apparatus of FIG. 6, when the illuminance is less than the reference illuminance and the brightness is less than the reference brightness in operation S31, in operation S32, it is determined whether a UI (e.g., a predetermined UI) may be used. Here, the UI may be a button or a bright dot or dark dot, for example.

When it is determined in operation S32 that the UI may be used, in operation S33, the UI is used as an input unit.

When it is determined in operation S32 that the UI cannot be used, in operation S34, it is determined whether a brightness level of the display data of a current image may be increased so that a brighter image can be displayed. In addition, it is determined whether the brightness level of the display data may be increased such that a sufficient amount of light sensed by the optical sensor can be generated, and whether a brighter image may be displayed.

If it is determined in operation S34 that the brightness level of the display data may be increased, in operation S35, the brightness level of the display data is increased. The touch object may be imaged utilizing the optical sensor by utilizing the image that is implemented utilizing the display data having the increased brightness level as internal light. Thus, the touch position of the object may be determined.

If it is determined in operation S34 that the brightness level of the display data may not be increased, in operation S36, the flash mode is performed. Thus, the touch sensing unit 100 senses the touch of the object, and the plurality of organic ELs that are disposed in the organic light emitting display panel 200 forcibly emit light based on the touch sensing information so that the touch position can be determined by utilizing the internal light due to emission of light by the plurality of organic ELs.

Figure 9:
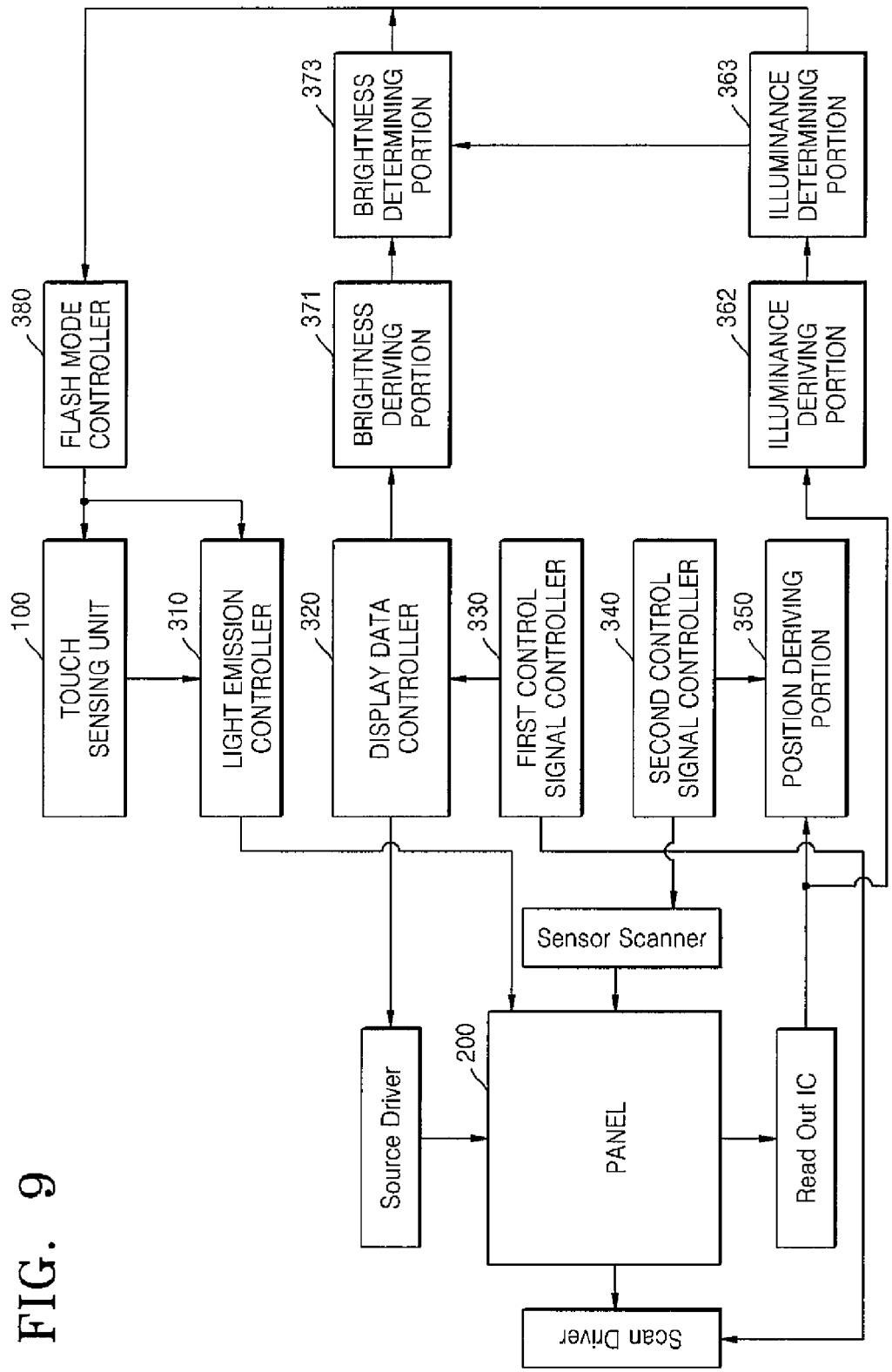
FIG. 9 schematically illustrates a touch screen display apparatus for performing a flash mode when the intensities of external light and internal light are low, according to another embodiment of the present invention.

FIG. 9 illustrates a touch screen display apparatus for performing a flash mode when the intensities of internal light and external light are low, according to another embodiment of the present invention. FIG. 9 illustrates a touch screen display apparatus that senses illuminance by utilizing the optical sensor of the organic light emitting display panel 200 without an illuminance sensing portion 361.

Referring to FIG. 9, the optical sensor disposed on the organic light emitting display panel 200 senses the external light, and a sensing signal of the external light sensed by the optical sensor is read from the ROIC. Then, the ROIC transmits the sensing signal to an illuminance deriving portion 362. The illuminance deriving portion 362 derives the illuminance from the sensing signal, and the illuminance determining portion 363 determines whether the illuminance is equal to or greater than a reference illuminance. The illuminance determination, brightness deriving, and brightness determination of the touch screen display apparatus of FIG. 9 are performed similarly as described with respect to FIG. 6, except that the illuminance sensing portion 361 is not provided and the illuminance is instead sensed by the optical sensor and is derived by the illuminance deriving portion 362. In addition, the touch screen display apparatus of FIG. 9 may use either the method of driving the touch screen display apparatus of FIG. 7 or FIG. 8.

Touch screen display apparatuses performing a flash mode when the intensities of external light and internal light are similar to each to other and methods of driving the same according to embodiments of the present invention will now be described with reference to FIGS. 10 through 12.

Figure 10:
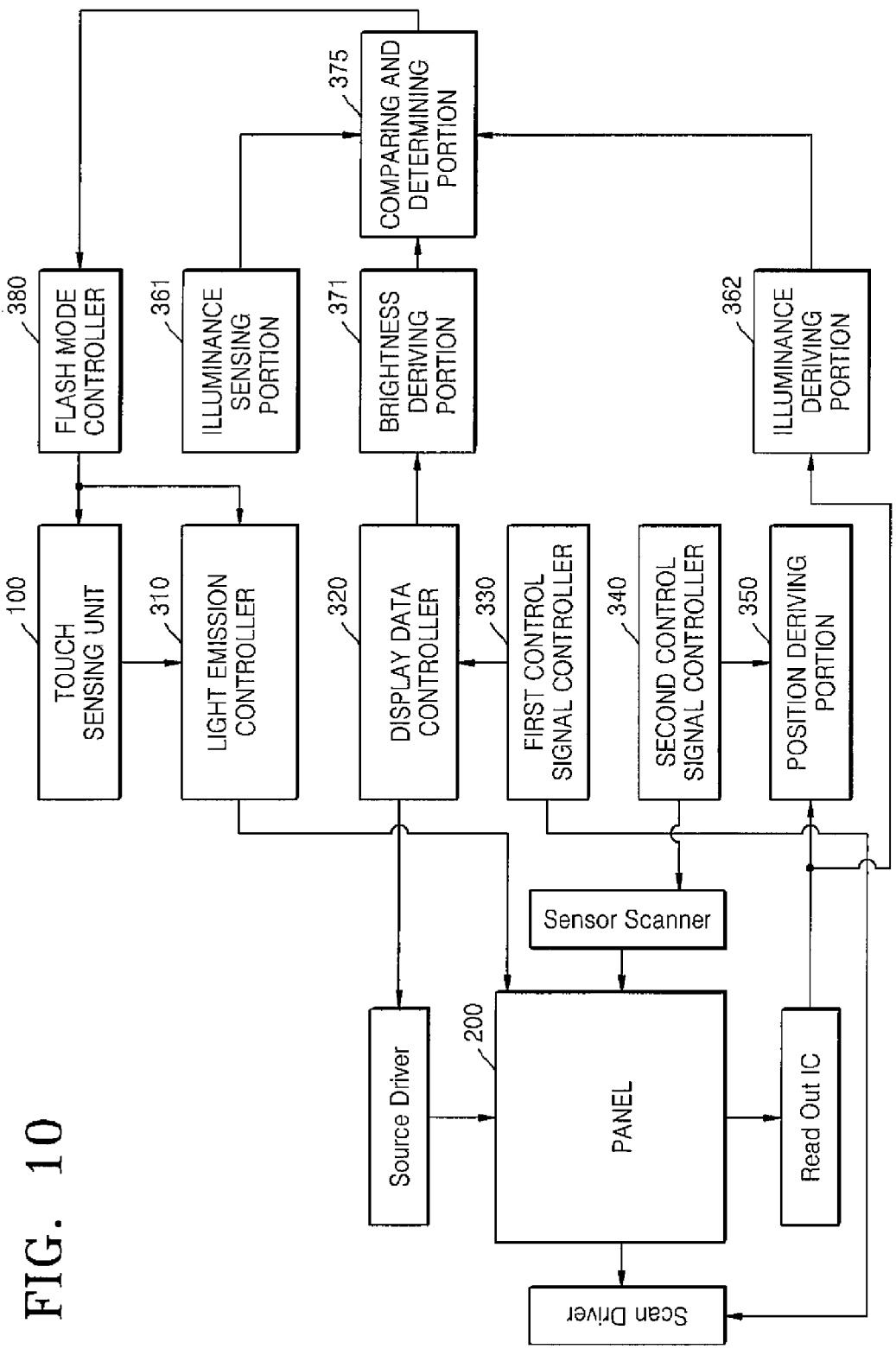
FIG. 10 schematically illustrates a touch screen display apparatus for performing a flash mode when the intensities of external light and internal light are similar to each other, according to another embodiment of the present invention.
Figure 11:
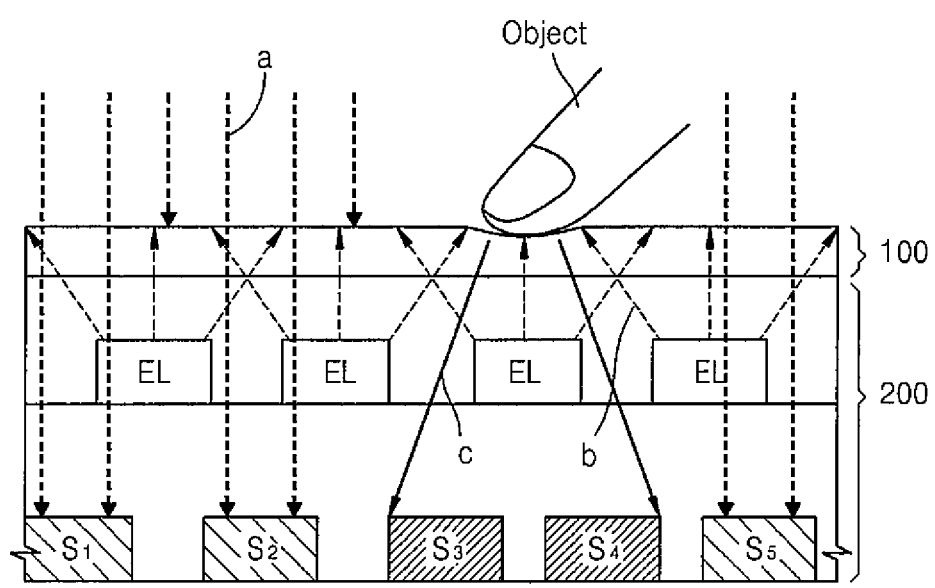
FIG. 11 schematically illustrates a case when the intensities of external light and internal light are similar to each other in the touch screen display apparatus of FIG. 10.

Referring to FIG. 10, the touch screen display apparatus includes an illuminance sensing portion 361, a brightness deriving portion 371, and a comparing and determining portion 375 that compares and determines illuminance and brightness provided by the illuminance sensing portion 361 and the brightness deriving portion 371, respectively. When the illuminance and the brightness are similar to each other, an image of a touch object may not be generated by an optical sensor and thus, the touch object image may not be obtained. Specifically, referring to FIG. 11, external light a is input to a portion of the first, second, and fifth optical sensors $S_1$, $S_2$, and $S_5$, and reflected light of internal light b is input to the third and fourth optical sensors $S_3$ and $S_4$. Thus, an image of the touch object may not be formed. When the amounts of reflected light of the external light a and the internal light b are similar to each other (e.g., when the amounts of reflected light of the external light a and the internal light b are substantially the same), the above case may occur. Thus, the plurality of organic ELs may forcibly emit light so that the amounts of reflected light of the internal light b are increased and the touch position may be determined. Alternatively, the emission of light of the plurality of organic ELs may be forcibly and temporarily prevented so that the touch position can be determined by using the external light a.

Thus, the comparing and determining portion 375 determines whether the illuminance and the brightness are similar to each other, to determine whether the amount of the external light a and the amount of the internal light b or the amounts of the reflected light of the internal light b are similar to each other. Also, similarity settings may be pre-set based on previous experience.

In addition, the touch screen display apparatus may further include an illuminance deriving portion 362. The illuminance deriving portion 362 may derive illuminance from the ROIC, and the brightness deriving portion 371 may derive brightness, and the comparing and determining portion 375 may compare and determine the illuminance and the brightness.

Hereinafter, the method of driving the touch screen display apparatus of FIG. 10, according to an embodiment of the present invention, will be described with reference to FIG. 12.

Figure 12:
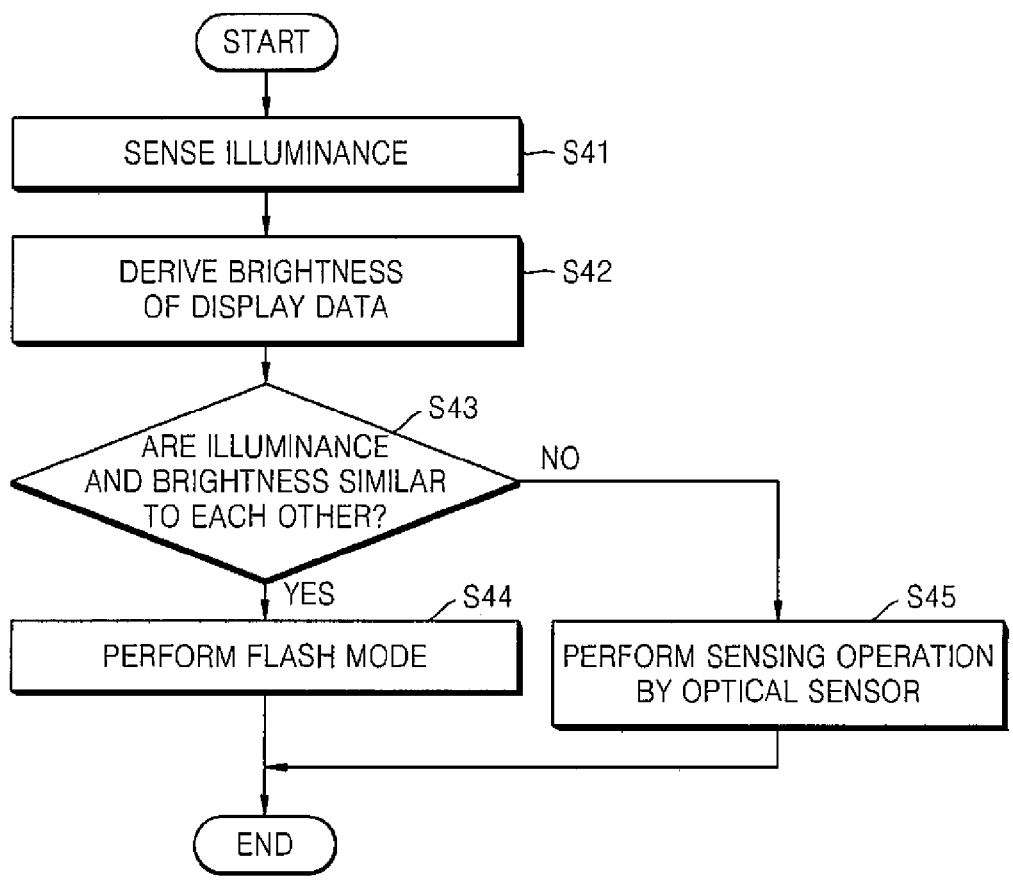
FIG. 12 is a flowchart illustrating a method of driving a touch screen display apparatus for performing a flash mode when the intensities of external light and internal light are similar to each other, according to another embodiment of the present invention.

Referring to FIG. 12, in operation S41, illuminance is sensed, and in operation S42, the brightness is derived from the display data. The sequence of performing the operation of the sensing of the illuminance (S41) and the operation of the deriving of the brightness (S42) may be interchangeable.

In operation S43, it is determined whether the illuminance and the brightness are similar to each other. In more detail, it is determined whether the external light corresponding to the illuminance and the internal light corresponding to the brightness are similar to each other. Here, when the external light corresponding to the illuminance and the internal light corresponding to the brightness are similar to each other (where external light is obtained by adding internal light and a value (external light=internal light+a)), the external light and the internal light may fall within a range (e.g., a predetermined range) where an image of the touch object may not be formed.

When it is determined in operation S43 that the illuminance and the brightness are similar to each other, in operation S44, the flash mode is performed. Otherwise, when it is determined in operation S43 that the illuminance and the brightness are not similar to each other, in operation S45, the image of the touch object is obtained by the optical sensor, and a touch position is determined.

Furthermore, when searching for the touch position fails, a touch screen display apparatus for performing a flash mode and a method of driving the same, according to embodiments of the present invention may be used. Such a touch screen display apparatus will now be described with reference to FIGS. 13 and 14.

Figure 13:
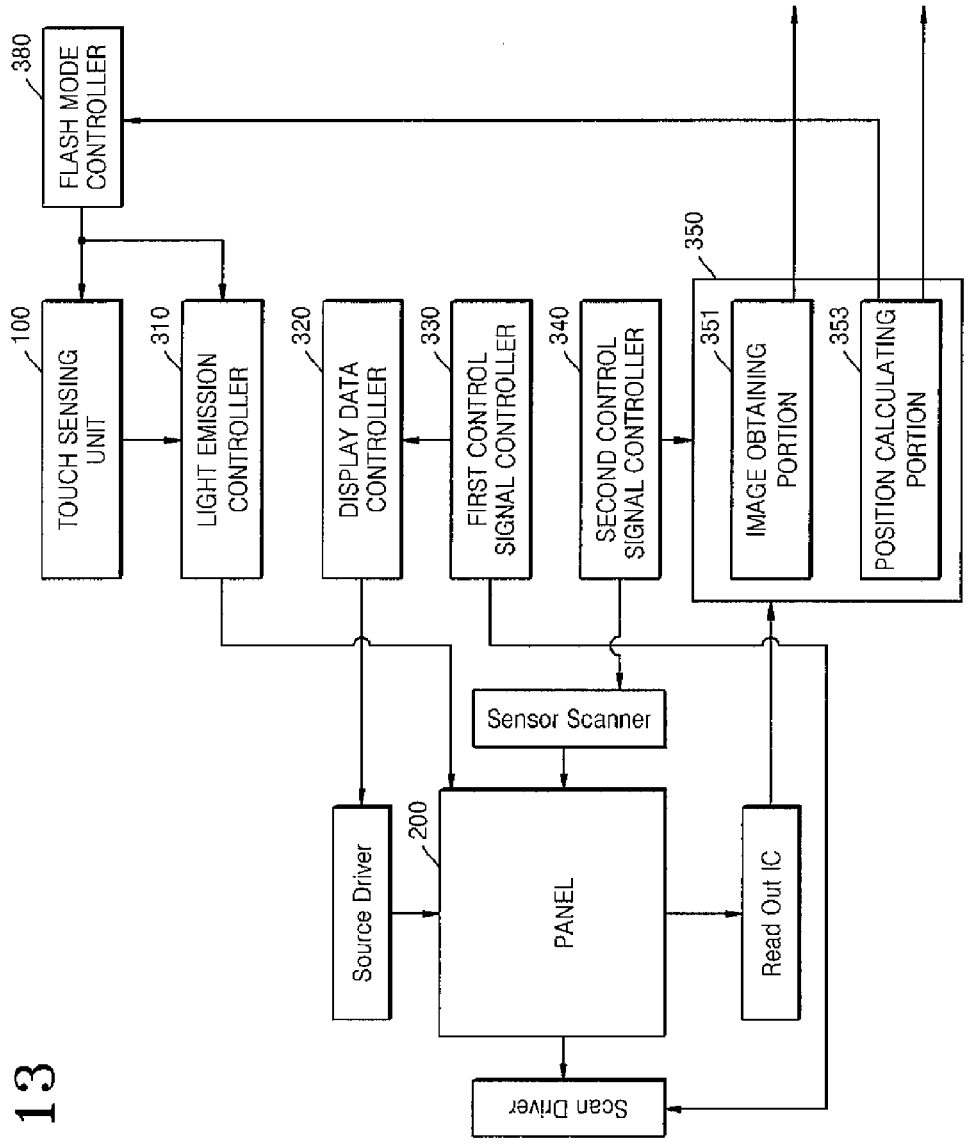
FIG. 13 schematically illustrates a touch screen display apparatus for performing a flash mode when a touch position is not searched for, according to an embodiment of the present invention.

Referring to FIG. 13, the ROIC may read a signal that is sensed by the optical sensor, and a position deriving portion 350 may determine the touch position based on the signal. More specifically, an image obtaining portion 351 may obtain the image of the touch object based on the signal, and a position calculating portion 353 may calculate and derive the touch position by analyzing the image of the touch object. In this case, when the image obtaining portion 351 may not obtain the image of the touch object or when the position calculating portion 353 may not calculate or derive the touch position, the flash mode controller 380 operates. The touch sensing unit 100 senses a touch of an object, and when the touch is sensed by the touch sensing unit 100, the light emission controller 310 controls the organic light emitting display panel 200 to temporarily emit light.

Referring to FIG. 14, in operation S51, it is determined by an optical sensor whether the image of the touch object is obtained.

When it is determined in operation S51 that the image of the touch object is obtained, in operation S52, the image is analyzed to determine whether the touch position is derived. When it is determined in operation S52 that the touch position is derived, the optical sensor operates based on information about the touch.

Otherwise, when it is determined in operation S51 that the image of the touch object is not obtained, in operation S53, the flash mode is performed. In addition, it is determined in operation S52 that the touch position is not derived by analyzing the image, the flash mode is performed in operation 54.

Although the above embodiments are described separately, they may include determination of at least two items. For example, when it is determined that the illuminance and the brightness are equal to or greater than a reference illuminance and/or a reference brightness, respectively, it may be further determined whether the illuminance and the brightness are similar to each other. When it is further determined that the illuminance and the brightness are similar to each other, a flash mode may be performed. In addition, when it is determined that the illuminance and the brightness are equal to or greater than the reference illuminance and the reference brightness, respectively, the touch position may be determined by the optical sensor. In this case, when the touch position cannot be derived, the flash mode may be performed.

As described above, according to the present invention, when the conditions of internal light and/or external light are inappropriate for obtaining an image of a touch object by utilizing an optical sensor, an organic light emitting display panel may forcibly and temporarily emit light such that a touch position can be determined by the optical sensor. Thus, the touch screen display apparatus in which the optical sensor is integrated can be more widely used as compared to a general touch screen display apparatus.

The present invention provides a touch screen display apparatus which enhances reliability by recognizing a touch position by utilizing internal light, even when the touch position cannot be sensed by utilizing external light, and a method of driving the apparatus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen display apparatus comprising:
   a panel comprising a display unit and an optical sensor unit, wherein the display unit comprises:
      a plurality of pixels comprising:
         a plurality of pixel circuit portions, and
         a plurality of light emitting devices,
         wherein each of the pixels comprises one of the pixel circuit portions and one of the light emitting devices, and
         wherein each of the pixel circuit portions is connected to a corresponding one of the light emitting devices for controlling an emission of the corresponding one of the light emitting devices for displaying a display image according to a display data applied to a data line, and
      a switching element connected to the light emitting devices for independently controlling emission of the light emitting devices for the optical sensor unit, and the optical sensor unit comprises an optical sensor for generating a touch object image;
   a touch sensing unit on the panel for sensing a touch of a touch object, the touch sensing unit comprising an electrostatic sensor, a pressure sensor, or a resistive sensor; and
   a light emission controller for generating and outputting a light emission control signal to the switching element in response to a touch sensing signal received from the touch sensing unit, and for controlling the light emitting devices to emit light using the switching element in response to a light emission signal.

2. The apparatus of claim 1, wherein the light emission controller comprises:
   a touch measuring portion for measuring a touch sensing signal corresponding to the touch of the touch object;
   a touch determining portion for determining whether a touch is performed by comparing the touch sensing signal with a reference signal; and
   a light emission signal generator for generating the light emission signal when a touch of the touch object is performed in accordance with a result of the determination of the touch determining portion.

3. The apparatus of claim 1, further comprising a position deriving portion for deriving a touch position from the touch object image.

4. The apparatus of claim 1, further comprising a flash mode controller for controlling operations of the touch sensing unit and the light emission controller.

5. The apparatus of claim 4, further comprising:
   an illuminance sensing unit for sensing an external illuminance; and
   an illuminance determining portion for comparing the external illuminance with a reference illuminance.

6. The apparatus of claim 5, wherein when the external illuminance is less than the reference illuminance and a touch position is not derived by a position deriving portion, the flash mode controller is configured to operate the touch sensing unit and the light emission controller.

7. The apparatus of claim 5, further comprising:
   a brightness deriving portion for deriving a brightness of the display image; and
   a brightness determining portion for comparing the brightness of the display image with a reference brightness.

8. The apparatus of claim 7, wherein when the brightness of the display image is less than the reference brightness and a touch position is not derived by a position deriving portion, the flash mode controller is configured to operate the touch sensing unit and the light emission controller.

9. The apparatus of claim 4, further comprising:
an illuminance deriving portion for deriving an external illuminance from the optical sensor; and
an illuminance determining portion for comparing the external illuminance with a reference illuminance.

10. The apparatus of claim 9, wherein when the external illuminance is less than the reference illuminance and the touch position is not derived by a position deriving portion, the flash mode controller is configured to operate the touch sensing unit to sense a touch of the touch object and to operate the light emission controller to control the light emitting devices to emit light when a touch of the touch object is sensed by the touch sensing unit.

11. The apparatus of claim 10, further comprising:
a brightness deriving portion for deriving a brightness of the display image; and
a brightness determining portion for comparing the brightness with a reference brightness,
wherein when the brightness is less than the reference brightness, the flash mode controller is configured to operate the touch sensing unit and the light emission controller.

12. The apparatus of claim 4, further comprising a position deriving portion for deriving a touch position from the touch object image, wherein when the touch position is not derived by the position deriving portion, the flash mode controller is configured to operate the touch sensing unit and the light emission controller.

13. The apparatus of claim 12, wherein the position deriving portion
comprises an image obtaining portion for obtaining the touch object image and a position calculating portion for determining a touch position by analyzing the touch object image, and wherein the touch position is not derived by a position deriving portion when the touch object image is unable to be obtained by the image obtaining portion or when the touch position is unable to be determined by the position calculating portion.

14. The apparatus of claim 4, further comprising:
an illuminance sensing unit for sensing an external illuminance;
a brightness deriving portion for deriving the brightness of the display image; and
comparing and determining portion for comparing the external illuminance and the brightness of the display image, and
wherein when the external illuminance and the brightness are similar to each other and a touch position is not derived by a position deriving portion, the flash mode controller is configured to operate the touch sensing unit and the light emission controller.

15. The apparatus of claim 14, wherein the external illuminance is measured by the optical sensor.

16. The apparatus of claim 14, the flash mode controller is configured to operate the light emission controller to emit light or to prevent the emission of light, in order to generate the amount of light required for the optical sensor, when a touch of the touch object is sensed by the touch sensing unit.

17. A method of driving a touch screen display apparatus comprising a display unit and an optical sensor unit, wherein the display unit comprises a plurality of pixels comprising a plurality of pixel circuit portions, and a plurality of light emitting devices, wherein each of the pixels comprises one of the pixel circuit portions and one of the light emitting devices, and wherein each of the pixel circuit portions is connected to a corresponding one of the light emitting devices for controlling an emission of the corresponding one of the light emitting devices for displaying a display image according to a display data applied to a data line, the display unit further comprising a switching element connected to the light emitting device for independently controlling emission of the light emitting devices for the optical sensor unit, and the optical sensor unit comprises an optical sensor for generating a touch object image, the method comprising:
sensing a touch of a touch object and generating a sensing signal, the sensing of the touch utilizing an electrostatic capacity method, a pressure reducing method, or a resistive membrane method;
generating a light emission signal corresponding to the sensing signal and outputting the light emission signal to the switching element; and
emitting light by the light emitting devices using the switching element in response to the light emission signal.

18. The method of claim 17, further comprising comparing the sensing signal with a reference signal, wherein when the sensing signal is greater than the reference signal, the light emission signal is generated.

19. The method of claim 17, further comprising:
obtaining the touch object image from emission of the light emitting devices; and
deriving a touch position from the touch object image.

20. The method of claim 17, further comprising:
sensing an external illuminance;
comparing the external illuminance with a reference illuminance, and
generating the sensing signal and the light emission signal when the external illuminance is less than the reference illuminance.

21. The method of claim 20, further comprising:
deriving brightness of the display image;
comparing the brightness with a reference brightness, and
generating the sensing signal and the light emission signal when the brightness is less than the reference brightness.

22. The method of claim 20, wherein the external illuminance is measured by the optical sensor.

23. The method of claim 19, wherein when the touch position is not derived by a position deriving portion, the sensing signal and the light emission signal are generated.

24. The method of claim 17, further comprising:
sensing an external illuminance;
deriving brightness of the display image;
comparing the external illuminance and the brightness of the display image; and
generating the sensing signal and the light emission signal when the external illuminance and the brightness are similar to each other.

25. The method of claim 24, wherein the external illuminance is measured by the optical sensor.

26. The method of claim 24, wherein the light emission signal is generated to emit light or to prevent the emission of light of light emitting device, in order to generate the amount of light required for the optical sensor, when a touch of the touch object is sensed.

* * * * *